United States Patent [19]

Hadaway

[11] 4,198,787
[45] Apr. 22, 1980

[54] TRAVERSING MECHANISM

[75] Inventor: Bernard M. Hadaway, Melbourne, Australia

[73] Assignee: Repco Limited, Australia

[21] Appl. No.: 954,856

[22] Filed: Oct. 26, 1978

[30] Foreign Application Priority Data

Nov. 1, 1977 [AU] Australia .............................. 2254/77

[51] Int. Cl.² ...................... B24B 47/02; F16H 19/06
[52] U.S. Cl. ........................................... 51/231; 74/37
[58] Field of Search .................... 51/231, 92 R; 74/37

[56] References Cited

U.S. PATENT DOCUMENTS

| | | | |
|---|---|---|---|
| 2,517,546 | 8/1950 | Deakin | 74/37 |
| 2,677,923 | 5/1954 | Parker | 51/231 |
| 3,029,649 | 4/1962 | Steyh | 74/37 |
| 4,085,621 | 4/1978 | Hadaway | 74/37 |

*Primary Examiner*—Harold D. Whitehead
*Attorney, Agent, or Firm*—Stevens, Davis, Miller & Mosher

[57] ABSTRACT

A traversing mechanism of the kind in which a carriage is alternately releasably clamped to a respective one of two parallel runs of an endless belt so as to be reciprocated along a guided path. A coupling wheel is rotatably mounted on the carriage at a location between the two belt runs and has a plurality of radially projecting lobes provided around its outer periphery. In operation, the wheel is rotated in stepwise fashion as permitted by a sliding escapement, to sequentially adopt a plurality of operative positions in each of which a run of the belt is clamped between a wheel lobe and one of the backing surfaces. Each backing surface is mounted for movement towards and away from the respective adjacent belt run under the influence of a camming actuator. The actuator is movable between an engage position in which it urges the two backing surfaces into a position in which it can adopt clamping engagement with the belt, and a disengage position in which the backing surfaces cannot adopt clamping engagement with the belt.

9 Claims, 10 Drawing Figures

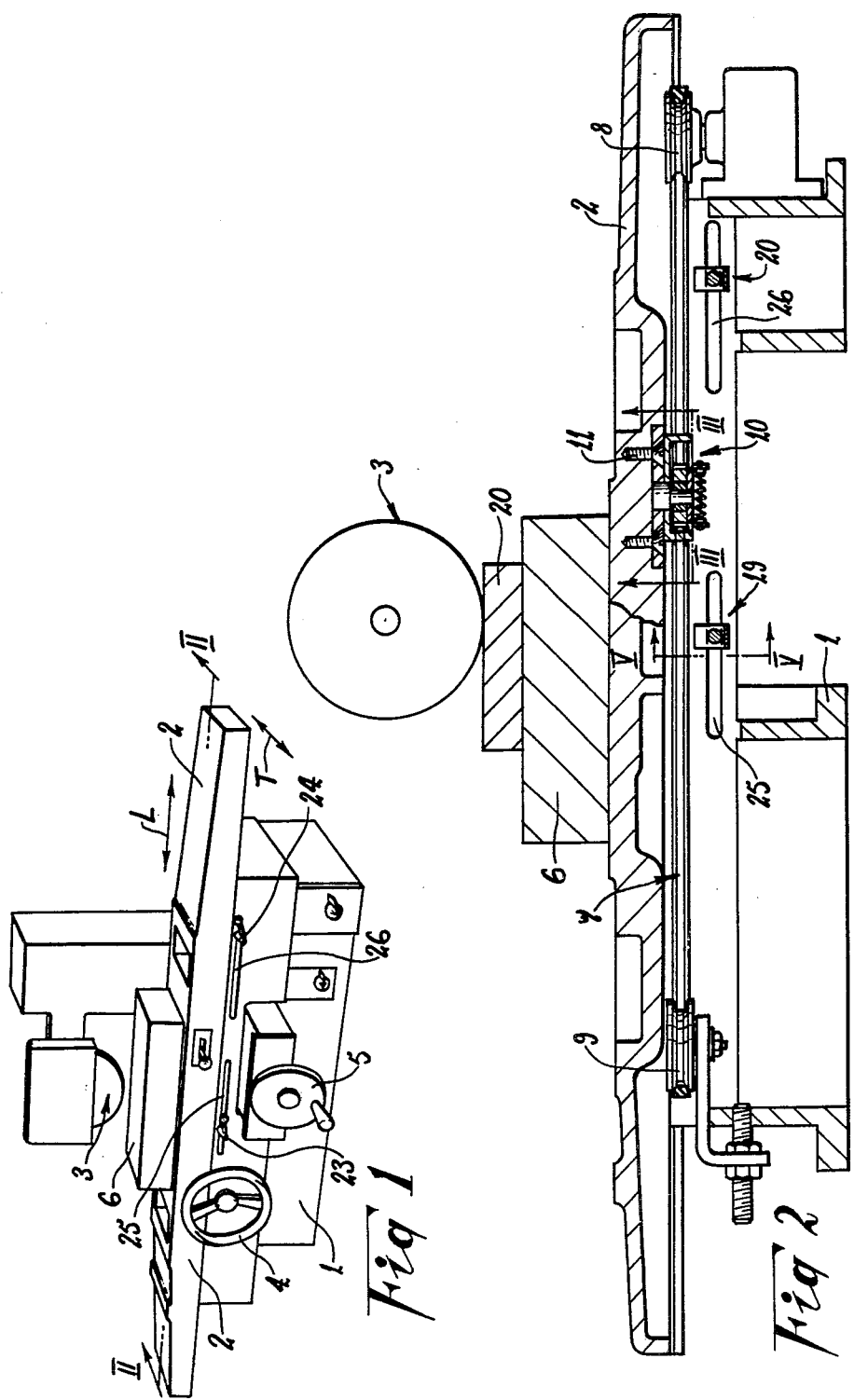

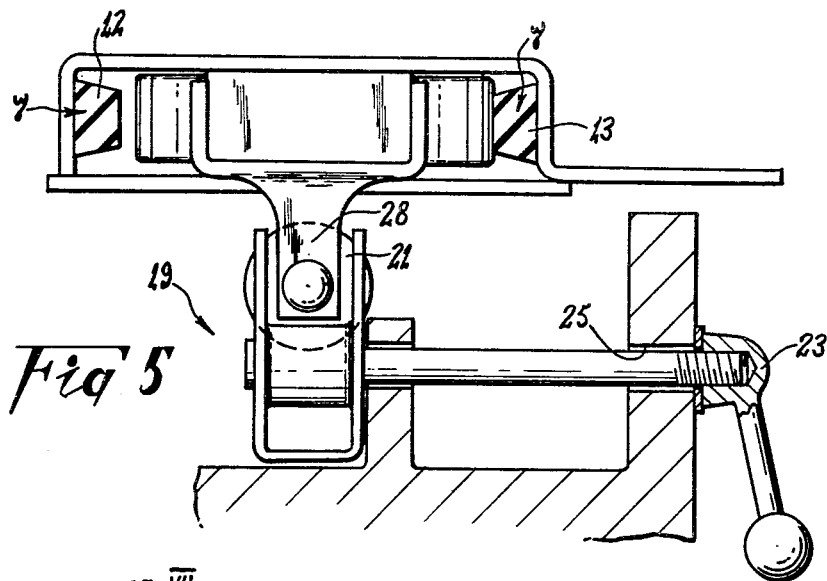
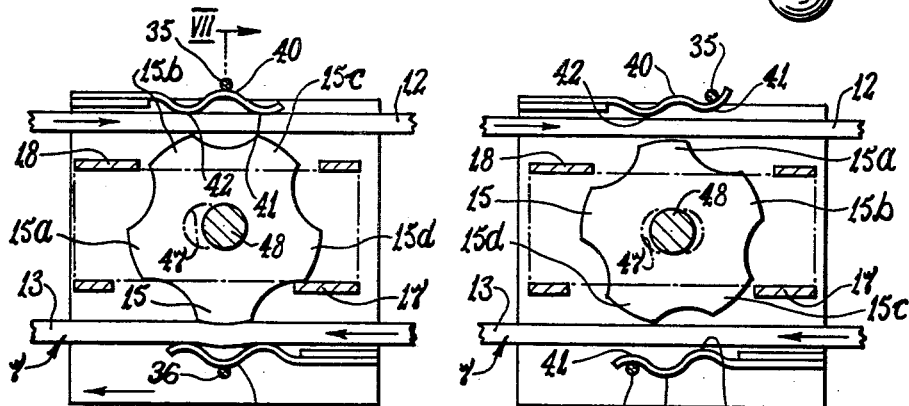
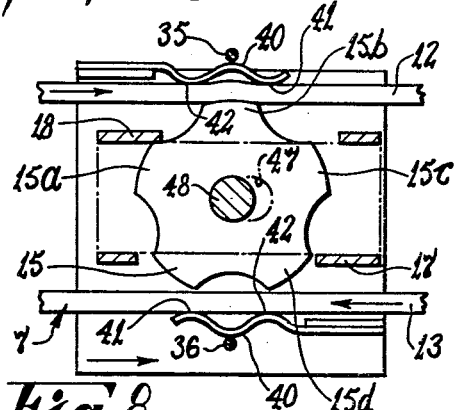
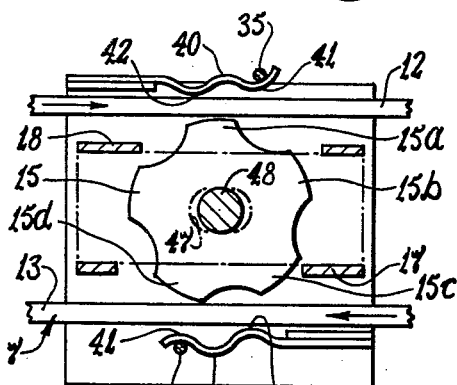
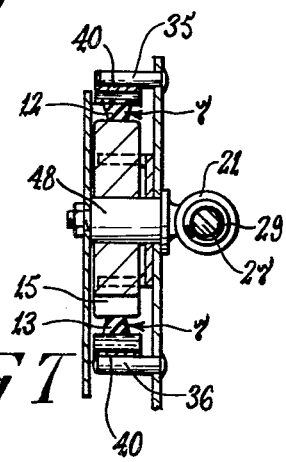

TRAVERSING MECHANISM

This invention relates to traversing mechanisms in general. Such mechanisms have many uses—e.g., controlling movement of a reciprocable part of a machine tool, or controlling the winding of yarn or other filamentary materials such as wire, onto a package. It will be convenient to hereinafter describe the invention in relation to yarn winding and to grinding machines, but the invention has many other applications such as flat bed knitting machines.

The invention is particularly concerned with traversing mechanism of the kind including a reciprocable carriage driven by an endless belt in a manner such that reversal of the carriage movement occurs without reversing the direction of belt movement. That is achieved by having the carriage located adjacent two parallel runs of the belt, and a coupling device associated with the carriage is located between the belt runs and engages one belt run or the other according to the desired direction of carriage movement. An example construction of that kind forms the subject of U.S. Pat. No. 4,085,621.

A problem with mechanisms of the foregoing kind is that the carriage is not completely releasable from the influence of the drive belt, and that can be very inconvenient in some applications—e.g., grinding machines and knitting machines. That is, the carriage coupling is so arranged that it cannot be conveniently rendered inoperative such as to permit the carriage to be moved (e.g. manually) independent of the drive belt.

It is an object of the present invention to provide traversing mechanism of the kind indicated having means for selectively rendering the drive coupling inoperative. It is a further object of the invention to provide such means which is simple in construction and yet effective in operation.

The basic characteristic of the mechanism is that a clutch device is associated with the mechanism carriage and is movable between engage and disengage positions at which the drive coupling is rendered operative and inoperative respectively. The clutch device may be operated manually, and/or it may be arranged for automatic operation—e.g., by responding to another part of the mechanism or associated equipment. It is convenient for the clutch device to include backing members located at the outside of each belt run and against which the belt can be clamped when the clutch is in the engage position. In operation, the drive coupling will function to clamp the belt to one backing member or the other according to the desired direction of travel of the carriage.

In accordance with the present invention, there is provided traversing mechanism including; a carriage movably mounted on guide means; drive means including an endless belt arranged so that each of two runs thereof extends substantially parallel to the path of conveyor movement along said guide means; a coupling wheel rotatably mounted on said carriage and having a plurality of radially projecting lobes arranged in circumferentially spaced relationship; said wheel being located between said belt runs and being rotatable in one direction to sequentially adopt each of a plurality of operative positions in which a respective said lobe engages one said belt run and the other said belt run remains unengaged by said wheel, the engagement of said wheel alternating from one said belt run to the other at each change of said operative position; and a pair of backing surfaces mounted on said carriage, each of which is located on the outside of a respective said belt run in opposed relationship to said wheel so that a section of a said run can be clamped between said wheel and the respective said backing surface when said wheel is in each said operative position; characterized in that each said backing surface is arranged for movement towards and away from said coupling wheel, and an actuator is mounted on said carriage for movement between an engage position in which it influences each said backing surface inwardly for clamping engagement with said belt, and a disengage position in which it releases said backing surfaces for outward movement such that a said belt run cannot be clamped thereagainst in any said operative position of the coupling wheel.

The essential features of the invention, and further optional features, are described in detail in the following passages of the specification which refer to the accompanying drawings. The drawings however, are merely illustrative of how the invention might be put into effect, so that the specific form and arrangement of the features (whether they be essential or optional features) shown is not to be understood as limiting on the invention.

In the drawings:

FIG. 1 is a perspective view of an example grinding machine incorporating one embodiment of the invention;

FIG. 2 is a longitudinal cross-sectional view, in semi-diagrammatic form, taken along line II—II of FIG. 1;

FIG. 5 is an enlarged view taken along line V—V of FIG. 2;

FIG. 6 is a view similar to FIG. 3 showing the traversing mechanism in one operative position;

FIG. 7 is a cross-sectional view taken along line VII—VII of FIG. 6;

FIG. 8 is a view similar to FIG. 6 but showing the mechanism in a different operative position;

FIG. 9 is a view similar to FIG. 8 but showing the clutch device released;

Figure 3:
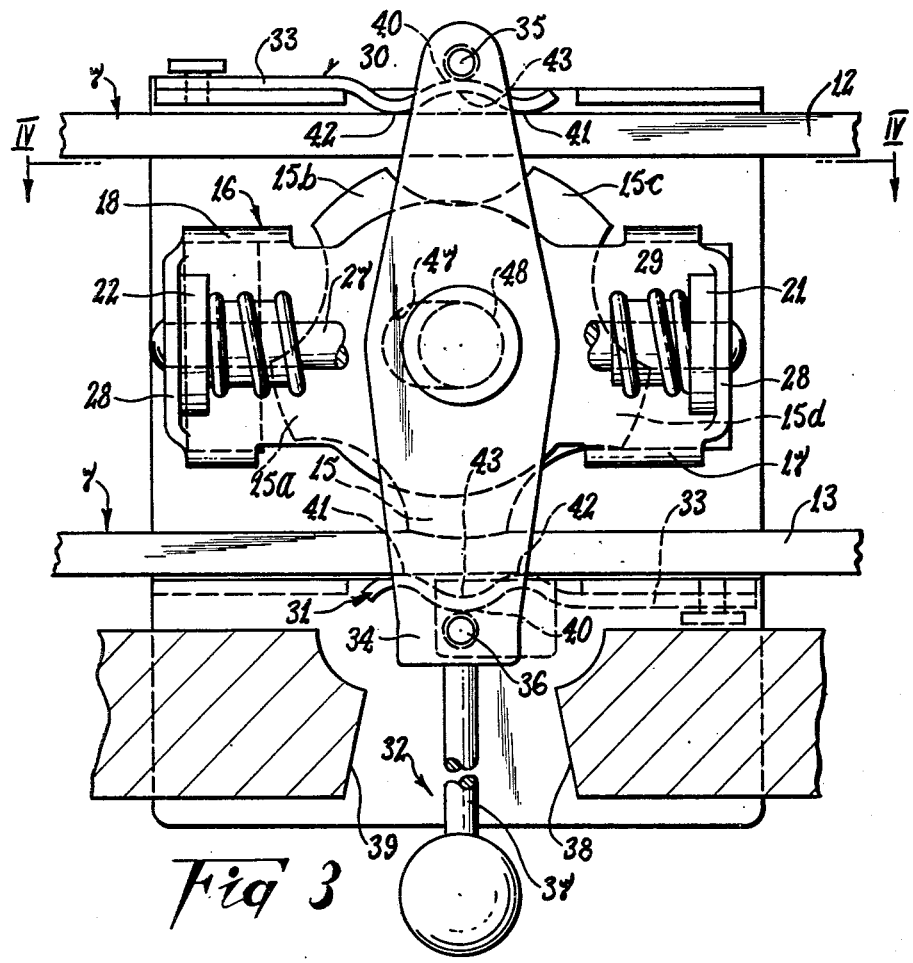
FIG. 3 is an enlarged view taken along line III—III of FIG. 2.

The following detailed description of an embodiment of the invention refers specifically to grinding machines, but as previously stated the invention has other applications. The particular embodiment described could be applied, with little or no modification, to other apparatus such as yarn winding machines and flat bed knitting machines.

Referring now to FIG. 1 of the drawings, that shows a grinding machine having a stationary body 1, a movable work table 2, and a grinding head 3. The table 2 is mounted on the body 1 for back and forth longitudinal movement in the directions of arrows L, and that may be effected automatically through traversing mechanism as hereinafter described, or manually through manipulation of the hand wheel 4. Hand wheel 5 can be turned to cause transverse movement of the table 2 in direction of arrows T. A workpiece 20 (FIG. 2) can be secured to the table 2 by means of a magnetic clamp 6.

Reciprocatory longitudinal movement of the table 2 is achieved automatically through traversing mechanism of the general kind forming the subject of U.S. Pat.

No. 4,085,621, and FIG. 2 shows the relationship between that mechanism and the table 2. The traversing mechanism includes an endless belt 7 which is mounted on a drive pulley 8 and an idler pulley 9. Both pulleys 8 and 9 are secured to the machine body 1, and any appropriate drive means (not shown) can be connected to the pulley 8 to cause rotation of that pulley and consequent movement of the belt 7. The traversing mechanism also includes a carriage 10 secured to the underneath of the table 2 through screws 11 or other suitable means, but the carriage 10 may be formed integral with the table 2 if desired.

In order that the traversing mechanism can function as required, the carriage 10 is slidably mounted on a guide way or slide bed so as to be movable along a path arranged parallel to the two runs 12 and 13 of the drive belt 7 which are adapted to influence movement of the carriage 10. In the particular example shown, the carriage 10 is secured to the table 2 which is guided for straight line movement in a known manner, so that the table guide also serves as the carriage guide. A coupling wheel 14 is mounted on the carriage 10 between the two belt runs 12 and 13, and that wheel has a plurality of radially projecting lobes 15 (e.g. five in number) circumferentially spaced in regular fashion around its periphery. The wheel 14 is rotatable between a plurality of operative positions, at each of which a respective one of the lobes 15 is engaged with a belt run 12 or 13, and that engagement alternates from one run to the other as the wheel 14 rotates. Such an arrangement is fully described in U.S. Pat. No. 4,085,621.

Figure 4:
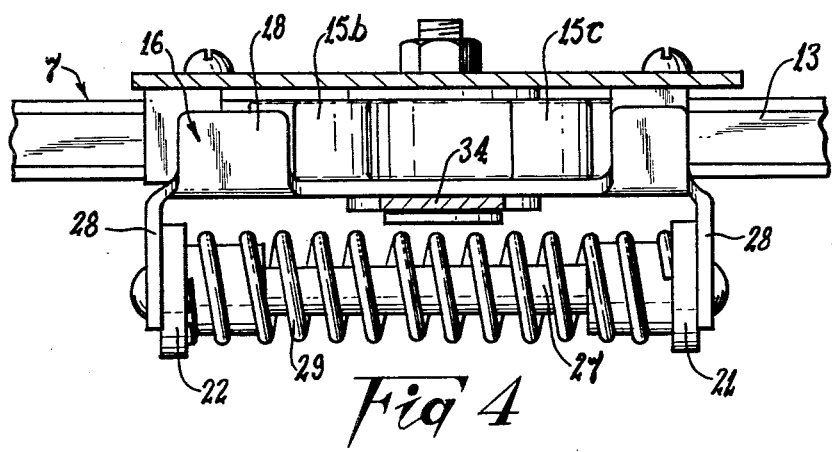
FIG. 4 is a sectional view taken along line IV—IV of FIG. 3.

The preferred traversing mechanism includes an escapement for controlling rotation of the coupling wheel 14, and that is in the form of a member 16 mounted on the carriage 10 for limited sliding movement in the direction of the carriage travel (see FIGS. 3, 4 and 7). The escapement member 16 is arranged to adopt either of two operative positions, which are shown in FIGS. 6 and 8 respectively and in each of which it interferes with the coupling wheel 14 so as to prevent rotation of that wheel beyond its particular operative position at that time. When the escapement 16 is at the position shown in FIG. 6, belt run 13 urges the wheel 14 in a clockwise direction, but rotation of the wheel 14 beyond the position shown is prevented by engagement of the lobe 15d with a barrier wall 17 of the escapement 16. It will be seen that, at that time, a corresponding barrier wall 18 at the opposite end of the escapement 16 is positioned clear of the wheel 14 and therefore has no influence on wheel rotation. In the FIG. 8 situation however, the roles are reversed in that the belt run 12 tends to turn the wheel 14 clockwise, barrier wall 18 is located in the path of lobe 15a, and barrier wall 17 is located clear of the wheel 14.

Movement of the escapement 16 is limited by a slot 47 through part of the escapement 16 and which receives a spindle 48 mounting the coupling wheel 14. The length of the slot 47 is such that the spindle 48 engages a respective end of the slot 47 at each of the extreme positions of the escapement 16.

Stop means provided at each extremity of the carriage travel functions to move the escapement 16 from one operative position to another, thereby permitting the coupling wheel 14 to rotate to its next operative position. In the arrangement shown, that stop means includes two adjustable stops 19 and 20 (FIG. 2) mounted on the machine body 1, and a cooperating abutment 21 and 22 respectively carried by the escapement 16. Each stop 19 and 20 is adapted to be secured in a selected position by manipulation of a respective clamping handle 23 and 24 (FIG. 1) and the associated slots 25 and 26 limit the extent of adjustment of the stops 19 and 20 respectively. The abutments 21 and 22 are each slidably mounted on a rod 27 secured to the escapement 16 against relative movement through a bracket 28 (FIGS. 3 and 5), and a spring 29 urges each abutment 21 and 22 into the outermost position as shown in FIG. 3.

In operation, initial engagement between a stop 19 or 20 and the corresponding abutment 21 or 22, causes compression of the spring 29, and at a subsequent stage the entire escapement 16 is caused to move in the direction of the applied force. Considering FIG. 6 for example, if such stop engagement causes movement of the escapement 16 towards the left, the lobe 15a will be freed from the barrier wall 17 and consequently the wheel 14 can rotate to place the lobe 15b into engagement with the belt run 12. In that regard, it will be appreciated that engagement between the lobe 15 and the belt run 13 will cause rotation of the wheel 14 such as to result in a change of the operative position of the wheel, and consequently a reversal of direction of movement of the table 2.

In accordance with the particular embodiment of the invention as shown, the carriage 10 has two backing members 30 and 31 (FIG. 3) mounted thereon and which form part of a clutch device. Each backing member 30 and 31 is located at a respective opposite side of the carriage 10 so that a respective run 12 and 13 of the drive belt 7 is interposed between that backing member and the coupling wheel 14. Furthermore, each backing member 30 and 31 is arranged for movement relative to the body of the carriage 10, towards and away from the coupling wheel 14, and a clutch actuator 32 is mounted on the carriage 10 to control that movement.

Each backing member 30 and 31 may include a plate or arm, as shown, having one end portion 33 secured to the carriage 10 and its opposite end portion arranged in opposed, and exposed, relationship to the outer side surface of the adjacent belt run 12 or 13. The plates 30 and 31 are mounted in such a way, or are prestressed, so that each adopts an outermost position relative to the belt run 12 or 13 when the clutch actuator 32 is in a disengage position (see FIG. 9). That outermost position of the backing plate 30 or 31 is such that the belt run 12 or 13 is able to pass freely between the plate 30 or 31 and the coupling wheel 14, even though the coupling wheel 14 may be at a normally operative position—i.e., the apex of a lobe 15 is on an imaginary line normal to the belt run 12 or 13 and passing through the rotational axis of the wheel 14. Under that condition, there may be clearance on both sides of the belt run 12 or 13, but clearance on one side only can be satisfactory if the sliding engagement at the other side is not such as to cause excessive wear of the belt 7.

Alternative to rigidly mounting the backing plates 30 and 31, each may be loosely mounted to enable the desired movement, but captured in such a way as to be retained on the carriage 10 at a suitable disposition relative to both the belt 7 and the clutch actuator 32. If desired, the operative end portion of the backing plate 30 or 31 which is engageable with the belt 7, may be provided with spaced flanges 43 (FIG. 10) arranged to overlie opposite edges of the belt 7, with clearance, so as to ensure that the belt 7 does not move out of alignment with the clamping face of the backing plate 30, 31.

That construction can be adopted whether the plate 30, 31 is rigidly or loosely mounted. Also, the flanges 43 may be an integral part of the plate 30, 31, or they may be formed by side walls of a channel member 44 secured to the plate 30, 31 in which event the base of that channel member may define the aforementioned clamping face.

The clutch actuator may comprise a lever 34, as shown, pivotally mounted on the carriage 10 for movement about the axis of the coupling wheel 14 and having a pair of camming sections 35 and 36, each of which is adapted to influence the position of a respective backing plate 30 and 31. In the example shown, each camming section 35 and 36 comprises a pin projecting from the lever 34 at a location behind its respective backing plate 30 and 31. The relationship between the camming pins 35 and 36 and the backing plates 30 and 31 is such that when the lever 34 is in one particular rotational position (the engage position—see FIG. 3) each pin 35 and 36 bears against the back of its respective backing plate 30 and 31 to hold that plate at its innermost position such that the coupling wheel 14 can clamp a belt run 12 or 13 against the plate. When the lever 34 is rotated to a disengage position as shown in FIG. 9, the pins 35 and 36 leave engagement with the backing plates 30 and 31 so that the plates can adopt their outermost position at which the coupling wheel 14 is rendered inoperative to clamp the belt 7, and consequently the carriage 10 is free to be moved independently of the belt 7. In some cases, the pins 35 and 36 may remain in engagement with their respective backing plates 30 and 31 at both rotational positions of the lever 34, but in the disengage position the arrangement is nevertheless such that the desired belt clearance is achieved.

It will be appreciated that the lever 34 may influence the backing plates 30 and 31 indirectly rather than directly as described above. The lever 34 may influence the backing plates 30 and 31 through a system of links or through any other appropriate intermediary which may or may not involve a camming action as described.

Stop means may be provided to limit movement of the lever 34 between the two positions described. In the example shown, a handle 37 secured to or formed as part of the lever 34 abuts either of two opposed stop surfaces 38 and 39 of the carriage body (FIG. 3). Alternatively, a lug (not shown) on the lever 34 or handle 37 may be arranged to abut opposite edges of a slot or recess (not shown) formed in an associated part of the carriage 10. Furthermore, releasable retaining means may be provided to resist inadvertent movement of the lever 34 from one position to another.

In the particular construction of FIG. 3, the operative end portion of each backing plate 30 and 31 is contoured to achieve the desired camming action described above. That contouring is such as to create an arcuate hump 40 at the outer face of the backing plate 30, 31, and two spaced arcuate ridges 41 and 42 at the inner clamping face. The ridges 41 and 42 extend along respective opposite sides of the recess 43 formed in the clamping face by creation of the hump 40.

When the clutch lever 34 is in the engage position, each camming pin 35 and 36 engages with the apex region of the associated plate hump 40, and the inner ridges 41 and 42 of each plate 30, 31 are thereby positioned to clamp a belt run 12 or 13 by cooperation with the coupling wheel 14. Preferably, the width of each wheel lobe 15 is not substantially less than the distance between centres of the ridges 41 and 42, so that in the operative position of the wheel 14 the belt run 12 or 13 is clamped at two zones, each of which is associated with a respective ridge 41 and 42. When the lever 34 is moved to the disengage position (FIG. 9), each pin 35 and 36 moves down one side of the respective plate hump 40 and thereby permits the plates 30 and 31 to move outwardly as required.

Figure 10:
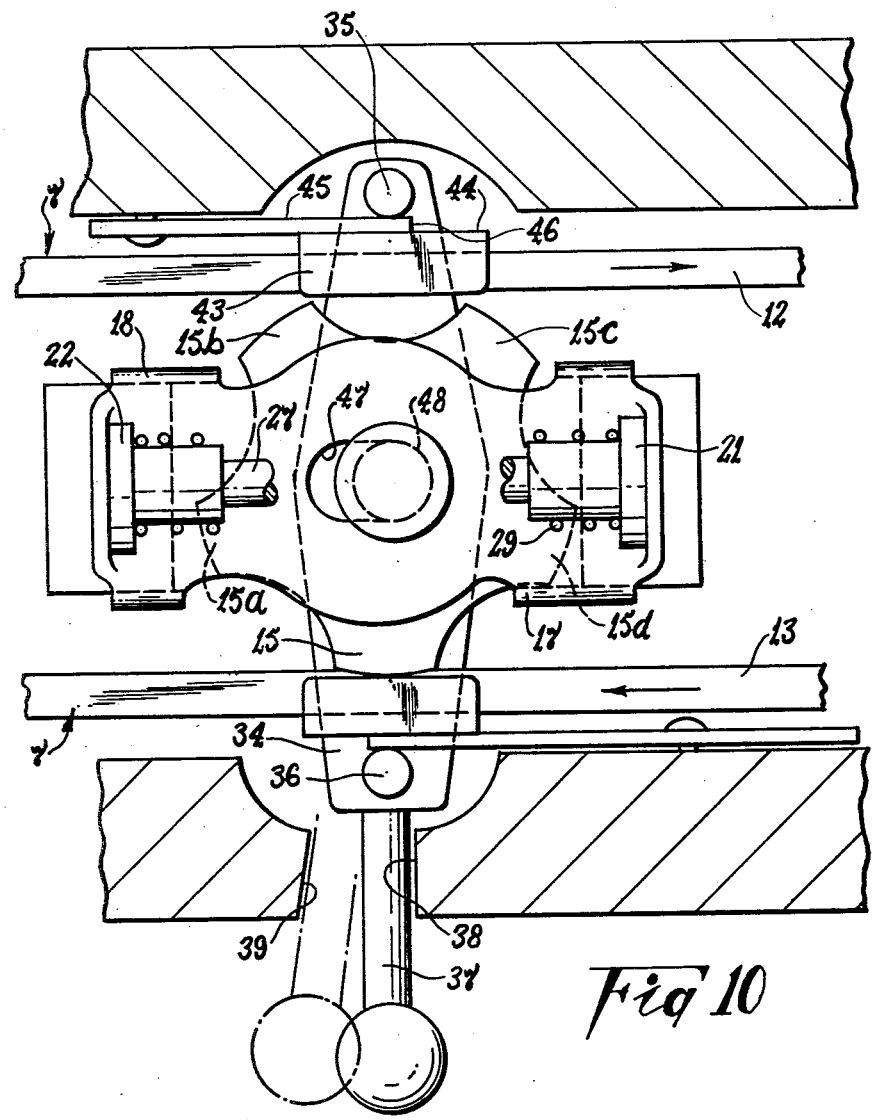
FIG. 10 is a view similar to FIG. 3 but showing an alternative embodiment.

In an alternative construction as shown in FIG. 10, the lever pins 35 and 36 bear on a substantially flat surface 45 of their respective backing plates 30 and 31, when the lever 34 is in the engage position. In the disengage position however, each pin 35 and 36 is moved beyond an edge 46 of the associated surface 45 so as to be clear of it, or is moved into a recess or ramp zone of that surface. It will be apparent that many other variations are possible.

It may be desirable under some circumstances to rigidify the camming pins 35 and 36 to guard against lateral deflection by bending of the lever 34 and/or bending of the actual pins 35 and 36. That may be achieved by forming the lever 34 as two plate-like sections which are located in spaced relationship on respective opposite sides of the coupling wheel 14. Each camming pin 35 and 36 then has its opposite ends secured to a respective one of those sections and is thereby firmly held against lateral deflection.

The releasable clutch effect can be achieved with actuators quite different to that particularly described. For example, the actuator could be slidably mounted rather than pivoted, and/or it may involve separately mounted sections for influencing each backing plate rather than a unitary construction as described.

It will be appreciated from the foregoing description, that a mechanism according to the invention is a substantial improvement over similar traversing mechanisms in that the carriage can be released at will from the influence of the drive belt. That is particularly advantageous in the case of grinding machines as it may be desirable to manually move the traversing carriage under some circumstances in such a machine. Furthermore, the facility for manual control of the carriage is achieved by a relatively simple and effective construction.

A particular advantage of the mechanism described is its simple yet effective construction. The fact that the clutch lever is movable about the same pivot axis as the coupling wheel, enables a high degree of accuracy to be achieved with minimum difficulty. That is, the positions of the camming pins and clamping faces of the coupling wheel lobes, are all directly related to a single datum—namely the wheel axis. As a result dimensional accuracy as required for effective operation of both the clutch and the coupling, is very easy to achieve.

Finally, it is to be understood that various alterations, modifications and/or additions may be introduced into the constructions and arrangements of parts previously described without departing from the spirit or ambit of the invention as defined by the appended claims.

Having now described my invention, what I claim as new and desire to secure by Letters Patent is:

1. Traversing mechanism including; guide means; a carriage movably mounted on said guide means; drive means including an endless belt arranged so that each of two runs thereof extends substantially parallel to the path of carriage movement along said guide means; a coupling wheel rotatably mounted on said carriage and having a plurality of radially projecting lobes arranged in circumferentially spaced relationship; said wheel being located between said belt runs and being rotatable in one direction to sequentially adopt each of a plurality of operative positions in which a respective said lobe engages one of said belt runs and the other said belt run remains unengaged by said wheel, the engagement of said wheel alternating from one said belt run to the other at each change of said operative position; a pair of backing surfaces mounted on said carriage, each of which is located on the outside of a respective said belt run in opposed relationship to said wheel so that a section of a said run can be clamped between said wheel and the respective said backing surface when said wheel is in each said operative position; means mounting each said backing surface for movement towards and away from said coupling wheel; and an actuator mounted on said carriage for movement between an engage position in which it influences each said backing surface inwardly for clamping engagement with said belt, and a disengage position in which it releases said backing surfaces for outward movement such that a said belt run cannot be clamped thereagainst in any said operative position of the coupling wheel.

2. Traversing mechanism according to claim 1, wherein an escapement is slidably mounted on said carriage for reciprocatory movement between two extreme positions in each of which it coacts with said coupling wheel to prevent rotation of that wheel in said one direction beyond the operative position adopted by the wheel at that time, and said escapement is operative to free said wheel for rotation from one said operative position to another each time it is moved from one said extreme position to the other.

3. Traversing mechanism according to claim 2, wherein said escapement is moved from one said extreme position to the other by engagement with either one of two stops between which said carriage moves, and resilient means mounted on said escapement is arranged to engage a respective said stop as the carriage approaches the limit of its travel in each direction and to subsequently influence said escapement to move from one said extreme position to the other.

4. Traversing mechanism according to claim 1, wherein each said backing surface has a portion arranged in opposed relationship with said coupling wheel, said actuator includes a lever pivotally mounted on said carriage, and cam means provided between said lever and each said backing surface portion is operative to cause said backing surface portions to adopt said inward position in the engage position of said lever and to adopt said outward position in the disengage position of said lever.

5. Traversing mechanism according to claim 4, wherein said cam means comprises two pins secured to said lever and an outer surface of each said backing surface portion, each said pin coacting with a respective said outer surface to urge said backing surface portions into said inward position.

6. Traversing mechanism according to claim 5, wherein each said outer surface includes an arcuate hump and each said pin engages the apex region of the respective said hump in said engage position of the lever.

7. Traversing mechanism according to claim 1, wherein an inner surface of each said backing surface portion has two spaced ridges which are engageable with the adjacent outer surface of said belt and extend transverse to the longitudinal direction of said belt, said ridges being arranged so that a said lobe of the coupling wheel is located centrally therebetween in a said operative position of the coupling wheel, and each said lobe has a width not substantially less than the central distance between said ridges.

8. Traversing mechanism according to claim 4, wherein said lever pivot is coaxial with said coupling wheel.

9. In a machine having a main body, a table guide secured to said main body, and a work table mounted on said table guide for relative back and forth straight line movement; traversing mechanism for controlling said work table movement and including; an endless belt secured to said main body and arranged so that each of the two runs thereof extend substantially parallel to said table line of movement; a coupling wheel rotatably mounted on said table and having a plurality of radially projecting lobes arranged in circumferentially spaced relationship; said wheel being located between said belt runs and being rotatable in one direction to sequentially adopt each of a plurality of operative positions in which a respective said lobe engages one of said belt runs and the other said belt run remains unengaged by said wheel, the engagement of said wheel alternating from one said belt run to the other at each change of said operative position; a pair of backing surfaces, each of which is located on the outside of a respective said belt run in opposed relationship to said wheel so that a section of said run can be clamped between said wheel and the respective said backing surface when said wheel is in each said operative position; means mounting each said backing surface on said work table for movement towards and away from said coupling wheel; and an actuator mounted on said work table for movement between an engage position in which it influences each said backing surface inwardly for clamping engagement with said belt, and a disengage position in which it releases said backing surfaces for outward movement such that a said belt run cannot be clamped thereagainst in any said operative position of the coupling wheel.

* * * * *